US008794537B2

(12) United States Patent
Guenter et al.

(10) Patent No.: US 8,794,537 B2
(45) Date of Patent: Aug. 5, 2014

(54) ADDITIONAL ENCODING IN CONVENTIONAL ONE-DIMENSIONAL BAR CODE SYMBOLOGIES

(75) Inventors: Erich Guenter, Hofheim (DE); Mark E. Maresh, Cave Creek, AZ (US); Thomas S. Mazzeo, Durham, NC (US); Colm Nolan, Navan (IE); Juan F. Vargas, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 13/599,107

(22) Filed: Aug. 30, 2012

(65) Prior Publication Data

US 2014/0061320 A1 Mar. 6, 2014

(51) Int. Cl.
*G06K 19/06* (2006.01)

(52) U.S. Cl.
USPC .................. 235/494; 235/462.01; 235/462.04

(58) Field of Classification Search
USPC ................................ 235/494, 462.01, 462.05
See application file for complete search history.

(56) References Cited

U.S. PATENT DOCUMENTS

| 5,203,591 | A | 4/1993 | Treat |
| 6,102,289 | A | 8/2000 | Gabrielson |
| 6,119,943 | A | 9/2000 | Christy |
| 6,398,117 | B1 | 6/2002 | Oakeson et al. |
| 6,550,685 | B1 | 4/2003 | Kindberg |
| 7,185,816 | B1 | 3/2007 | Shoobridge |
| 2010/0012736 | A1* | 1/2010 | Wilds et al. .................. 235/494 |

FOREIGN PATENT DOCUMENTS

| GB | 002444289 A | 6/2008 |
| GB | 2446300 A | 8/2008 |
| WO | 2010014084 A1 | 2/2010 |

OTHER PUBLICATIONS

Anonymous, "Walk-up Creation of large format Barcode images", Aug. 25, 2009; IP.com No. IPCOM000186538D. 3 pages.
"POSTNET", Internet-published article printed from http://en.wikipedia.org/wiki/POSTNET on Jul. 27, 2012. 3 pages.

* cited by examiner

*Primary Examiner* — Daniel Hess
(74) *Attorney, Agent, or Firm* — Marcia L. Doubet

(57) ABSTRACT

An additional layer of encoding is provided using conventional one-dimensional ("1-D") bar code symbology. Dark bars of at least 2 heights are used (where the dark bars may be narrow or wide, and may be separated by a space that is narrow or wide) for 2-dimensional ("2-D") encoding. Whereas the width of the dark bars is significant in the 1-D encoding, the height of the dark bars is significant for the 2-D encoding. In one approach, dark bars of a shortest height are used for encoding conventional 1-D data, while dark bars of other heights encode additional data in a 2-D portion of a bar code. In another approach, consecutive dark bars are used in combination, according to a mapping which correlates the various combinations of bar heights to respective characters. The 2-D encoding rules may be proprietary, providing a type of data privacy.

14 Claims, 9 Drawing Sheets

HHHH = 1
HHSH = 2
HSHH = 3
SHHH = 4
HHSS = 5
HSHS = 6      *520*
SHHS = 7
HSSH = 8
HSSS = 9
SSSH = 0

*530*
where H = a high bar and S = a short bar

ADDITIONAL ENCODING IN CONVENTIONAL ONE-DIMENSIONAL BAR CODE SYMBOLOGIES

BACKGROUND OF THE INVENTION

The present invention relates to bar codes, and deals more particularly with encoding an additional layer of information in a conventional one-dimensional bar code symbology.

Existing 1-dimensional (hereinafter, "1-D") bar codes provide a limited amount of information. Furthermore, that information is limited to specific sets of characters. Depending on the bar code symbology that is used, the allowable character set may vary, but as a maximum the allowable characters are limited to the base ASCII character set. (The term "bar code symbology" refers to a predetermined manner in which bar codes encode alphanumeric text.)

Changing the bar code encodings to allow more information to be encoded requires new symbologies, and widespread changes throughout industry because of the number of existing 1-D bar code scanners with integrated firmware in use throughout the world that would not be able to read the changed encoding. Accordingly, requiring that all existing 1-D scanners are replaced with new scanners would result in significant expense.

Techniques are known for encoding additional information in 1-D bar codes by using color printing. However, use of color impacts the printing of legacy bar code labels. Most legacy bar code printers use either thermal printing or thermal transfer printing, both of which are monochrome. Bar codes may be printed on demand, or preprinted on labels. In either case, changing artwork to support multiple colors would have significant cost impacts. Some existing bar code scanners designed for monochrome may have difficulty determining bars and spaces due to the varying contrast ratio of the colored bars, which may make it necessary to replace the existing bar code scanners with ones that support decoding (i.e., reading) of labels printed in color, again implying a significant expense.

BRIEF SUMMARY OF THE INVENTION

The present invention defines techniques for 2-dimensional encoding within a conventional 1-dimensional bar code symbology. This preferably comprises encoding data in a plurality of dimensions within a bar code, the encoded data encoded so as to allow each of the plurality of dimensions to be decoded by a 2-dimensional bar code scan while providing backward compatibility whereby a 1-D bar code scan can decode a first of the dimensions. Preferably, the encoded data encodes the first of the dimensions using varying widths of dark bars and varying widths of spaces therebetween while encoding a second of the dimensions by varying a height of the dark bars that encode the first of the dimensions. In one aspect, the encoding of the second of the dimensions uses 3 different heights for the dark bars. In another aspect, the encoding of the second of the dimensions uses 2 different heights for the dark bars. In yet another aspect, the encoding of the second of the dimensions uses base N encoding with N different heights for the dark bars. The encoding of the second of the dimensions uses combinations of consecutive ones of the dark bars, whereby the varying height of the dark bars in each combination is decoded by comparison to a mapping (to ASCII characters, for example) that defines which character is represented by the combination.

Embodiments of these and other aspects of the present invention may be provided in various forms, including methods, systems (apparatus), and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 5 depicts an example set of rules, where these rules map combinations of bars of varying bar heights to corresponding digits, according to another preferred embodiment of the present invention;

DETAILED DESCRIPTION OF THE INVENTION

Embodiments of the present invention are directed toward encoding additional data within a 1-D bar code symbology. Two-dimensional (hereinafter, "2-D") encoding is disclosed, within any conventional or legacy 1-D bar code symbology, by varying the height of each dark bar in the 1-D bar code. Embodiments of the present invention encode the 2-D information as a type of extension of a 1-D bar code. The standard portion of the 1-D bar code remains readable by existing 1-D scanners, thus providing backward compatibility. The information in the additional dimension can be read by a 2-D scanner—and notably, the 2-D scanner can also read the 1-D portion. (Accordingly, an environment where a 2-D scanner is deployed does not need to separately scan the 1-D portion of the bar code with a 1-D scanner.)

A conventional 1-D bar code consists of narrow and wide dark bars, with narrow or wide spaces between them. The dark bars absorb light, and the spaces reflect light. A conventional 1-D bar code scanner (which may alternatively be referred to as a 1-D bar code reader) using a laser then scans the entirety of the 1-D bar code, measures the amount of light reflection and absorption given off, and translates that back as a sequence of wide and narrow dark bars and wide and narrow spaces, which is then decoded into the corresponding letters, numbers, or other characters according to the symbology that is used for the encoding.

Figure 1:
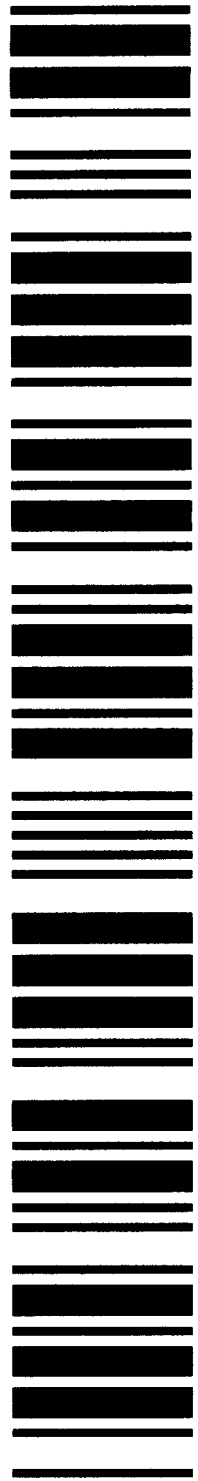
FIGS. 1 and 2 depict a sample prior art 1-D bar code, and a sample prior art 2-dimensional bar code, respectively, using known encodings.

FIG. 1 depicts a sample prior art 1-D bar code 100 using a well-known encoding referred to in the industry as "3 of 9". In this example, the information encoded in bar code 100 represents the 7-character string "1234ABC".

Figure 2:
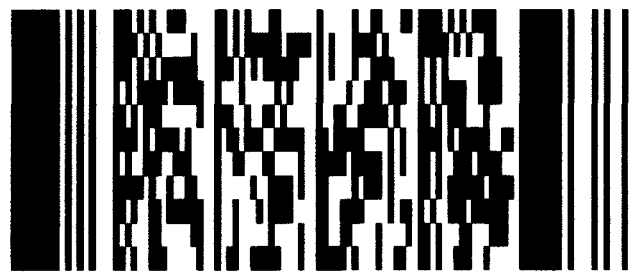

A 2-D bar code is a graphical image that stores information both horizontally (as 1-D bar codes do) and also vertically. FIG. 2 depicts a sample prior art 2-D bar code 200 using a well-known encoding referred to in the industry as "PDF417". In this example, the information encoded in bar code 200 also represents the 7-character string "1234ABC". Other 2-D encodings are known, in which the graphical image may vary in shape or color.

Figure 3:
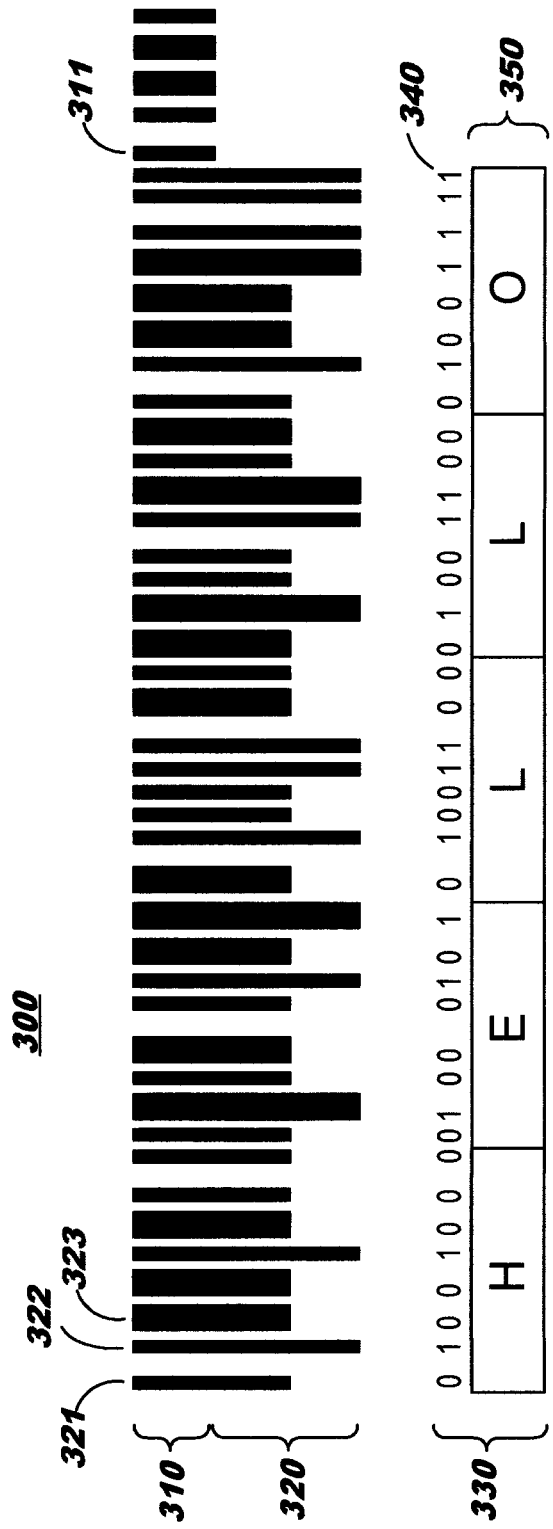
FIGS. 3 and 4 depict sample 2-dimensional bar code encodings, according to a first and second preferred embodiment of the present invention, respectively.
Figure 4:
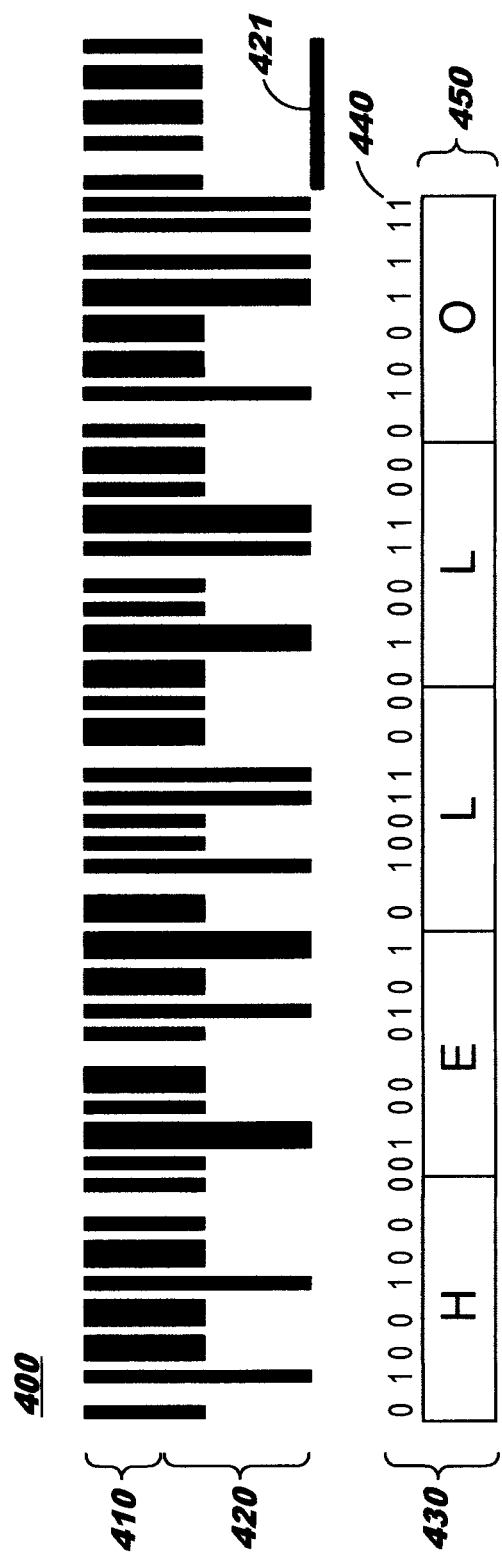

An embodiment of the present invention uses a 2-D bar code which is based on a conventional 1-D bar code, but in which the height of the dark bars varies, as compared to the encoding of a conventional 1-D bar code. Two preferred embodiments are illustrated in FIGS. 3 and 4, and an embodiment that uses a mapping based on combinations of dark bars is illustrated in FIG. 5 (all of which are discussed in further detail below). However, it should be understood that these examples are illustrative, and embodiments of the present invention are not limited to these illustrated encodings.

A first preferred embodiment of the present invention is illustrated by the sample 2-D bar code 300 in FIG. 3, in which three different bar heights are used to represent additional encoded data. This example superimposes additional encoded data onto bar code 100 of FIG. 1, such that a portion 310 of the bar code 300 conveys the information "1234ABC" in the "3 of 9" encoding, while additional data is encoded in portion 320. Portion 320 is therefore referred to herein as providing data in a second dimension—that is, data which is additional to the information provided in the conventional 1-D portion 310. In this embodiment, the encoding of the additional data in portion 320 extends from, but does not include, the conventional 1-D portion 310. For informational purposes only, a decoding of the sample additional encoded data from portion 320 is provided at reference number 330 of FIG. 3. This decoding 330 first shows the bits 340 that correspond to a decoding of the patterns of dark bars and spaces in additional encoded data 320, and then shows each of the ASCII characters 350 which are represented by sequences of 8 contiguous bits. Accordingly, decoding 330 indicates that the sample additional encoded data 320 encodes the 5-character string "HELLO". (It should be understood that decoding 330 does not form part of the actual 1-D bar code.)

For this embodiment that uses dark bars of 3 heights, the shortest height (see 310 of FIG. 3) is used for encoding the conventional 1-D bar code information as well as for identifying the left-to-right orientation and the end of the encoded additional data (as discussed in further detail below with reference to 311 of FIG. 3), and the other heights (see 320 of FIG. 3) are used for encoding additional data. Preferably, dark bars of the intermediate and longest height are binary-encoded, using 8 bits per byte in the ASCII character set. In the example of FIG. 3, binary 0 is associated with bars of the intermediate height, while binary 1 is associated with bars of the longest height (as shown at 340). Thus, bar 321 in the intermediate height represents a binary 0, and is encoded as the first of 8 bits in the letter "H" in the ASCII characters 350, whereas a bar 322 in the longest height represents a binary 1, and is encoded as the second of 8 bits in the letter "H". It should be noted that the width of the dark bars in the intermediate and longest height in additional encoded data 320 is not significant, in preferred embodiments. Instead, the width of the dark bars in the intermediate and longest height is set to the same width as the short bar on which the 2-D encoding is superimposed. Thus, for example, a binary 0 is represented by a narrow bar of intermediate height at 321, whereas a binary 0 is represented by a wide bar of intermediate height at 323.

One of ordinary skill in the art will recognize that while binary 0 and binary 1 are associated with dark bars of particular lengths in the example encodings presented herein, this is by way of illustration and not of limitation, and the associations may be changed without deviating from the scope of the present invention. (Binary 0 might be associated with bars of the longest height when using bars of 3 heights, for example, while binary 1 is associated with bars of the intermediate height.)

Preferably, a perimeter of "quiet space" is established surrounding an extended bar code as disclosed herein, where this perimeter includes an area adjacent to the top and bottom of the bar code, as well as an area adjacent to the left and right sides of the bar code.

As is well known, conventional 1-D bar codes (such as bar code 100 of FIG. 1) are decoded in a left-to-right order once the start and stop characters are determined. Accordingly, a preferred embodiment of the present invention aligns the encoding of the additional encoded data with the left-most bar of the 1-D encoding and proceeds left-to-right. The end of the additional encoded data is detected by presence of a dark bar of the shortest height, and accordingly, at least one short bar must always be present in this embodiment. Thus, if the entirety of the 2-D bar code uses some number "N" of bars, then the additional encoded data can use at most N−1 bars. In the example of FIG. 3, the first short bar is shown at 311. Because the shortest bar(s) will always be at least the right-most bar, the short bar(s) enable a bar code scanner to determine the orientation of the bar code and also enable the bar code scanner to detect that this bar code 300 uses a 2-D encoding, independent of decoding the conventional 1-D bar code. (Conventional 1-D start/stop characters, which are used with known techniques to determine 1-D bar code orientation, may also be present as part of the 1-D encoding for portion 310.) An alternative embodiment, however, could read the 1-D portion of the bar code to determine orientation of the additional 2-D encoded data, thereby allowing all "N" bars to be used, and this alternative embodiment is within the scope of the present invention.

A second preferred embodiment of the present invention is illustrated by the sample 2-D bar code 400 in FIG. 4, in which two different bar heights are used to represent additional encoded data. This example bar code 400 again conveys the information "1234ABC" in the "3 of 9" encoding at 410. In this embodiment, the additional data is encoded in portion 420, which both includes and extends the conventional 1-D portion 410 to provide data in a second dimension. For informational purposes only, a decoding of the sample additional encoded data from portion 420 is provided at reference number 430 of FIG. 4. This decoding 430 first shows the bits 440 that correspond to a decoding of the patterns of dark bars and spaces at 420, and then shows each of the ASCII characters 450 which are represented by sequences of 8 contiguous bits. Accordingly, decoding 430 indicates that the pattern at 420 encodes the 5-character string "HELLO". (It should be understood that decoding 430 does not form part of the actual bar code.)

For this embodiment that uses dark bars of 2 heights, the shorter bar height (see 410 of FIG. 4) is used for encoding binary 0 of the 2-D additional encoded data, while its width is used for conventional 1-D encoding. Similarly, the longer bar height (see 420 of FIG. 4) is used for encoding binary 1 of the 2-D additional encoded data, while its width is used for conventional 1-D encoding. Again, 8 bits per byte in the ASCII character set are preferably used in this embodiment. In the example of FIG. 4, binary 0 is associated with bars of the shorter height, while binary 1 is associated with bars of the longer height (as shown by the bits at 440). As with the encoding illustrated by FIG. 3, the width of the dark bars in the shorter and longer height is not significant for the encoding of the additional data.

A preferred embodiment of the present invention aligns the encoding of the additional encoded data with the left-most bar of the 1-D encoding and proceeds left-to-right. A preferred approach for detecting the end of the additional encoded data in this embodiment will now be discussed.

In this approach using dark bars of 2 heights, the end of the additional encoded data is detected by presence of a dark horizontal bar, and thus a dark horizontal bar must always be present when using this approach. Accordingly, if the entirety of the 2-D bar code uses some number "N" of bars, then the additional encoded data can use at most N−1 bars. In the example of FIG. 4, the horizontal bar is shown at 421 (and in this example, bar 421 extends the full remaining width of the 1-D encoding 410). Because the horizontal bar will always align with the first short bar that follows the encoded additional data when using this approach, the horizontal bar can be used by a bar code scanner to determine the orientation of the bar code and also to detect that this bar code 400 uses a 2-D encoding. (Conventional 1-D start/stop characters, which are used with known techniques to determine 1-D bar code orientation, may also be present as part of the 1-D encoding for portion 410.)

An embodiment using dark bars of 2 heights (for which the above-described approach is illustrated in FIG. 4) may be advantageous over an embodiment using dark bars of 3 heights (as illustrated in FIG. 3) because of the need to support one less bar height.

In other embodiments, an encoding according to the present invention uses base N encoding, where N is an integer value, instead of the binary (i.e., base 2) encoding illustrated in FIGS. 3 and 4. For example, in a base 16 (i.e., hexadecimal) encoding, 16 different bar heights are used. While such an embodiment uses more bar heights than the embodiments which were illustrated by FIGS. 3 and 4, such embodiments are thereby capable of encoding more data within a given 1-D bar code. For example, in a hexadecimal encoding embodiment, only 2 bars (each representing a hexadecimal value) are needed for encoding the same ASCII characters that takes 8 bars (each representing a single bit) in the approach illustrated by FIGS. 3 and 4. (Note that a practical limitation on the number of different bar heights may be determined according to the ability of a scanner to accurately distinguish among the different heights.)

In yet another embodiment, an encoding according to the present invention uses combinations of consecutive bars of varying bar heights, along with a set of rules that defines which combination corresponds to which ASCII character. Accordingly, multiple different embodiments may be envisaged that each use a different set of encoding rules. FIG. 5 presents one example set 500 of encoding rules, where these rules map combinations of 4 consecutive bars of varying bar heights to corresponding digits. In this example, 4 consecutive bars are used in combination, and the bars are limited to 2 heights. As shown in the legend 530 of FIG. 5, the character "H" in the sample rules refers to a higher (i.e., longer) bar and the character "S" refers to a shorter bar. Thus, a consecutive sequence of 4 bars of the higher height represents the number 1 in this example (see reference number 510), and a consecutive sequence of 2 higher bars followed by 2 shorter bars represents the number 5 (see reference number 520).

As will be obvious to those of ordinary skill in the art, the approach illustrated by FIG. 5 allows for encoding 16 different characters (computed as 24, where 2 is the number of bar heights and 4 is the number of consecutive bars used in combination). Note that FIG. 5 shows only 10 characters out of 16 possible characters. Combinations that use more than 4 consecutive bars, and/or combinations using more than 2 different bar heights, may be used to create different sets of encoding rules. Using 3 bar heights in groups of 4 consecutive bars, for example, allows for encoding 34=81 different characters.

Figure 6:
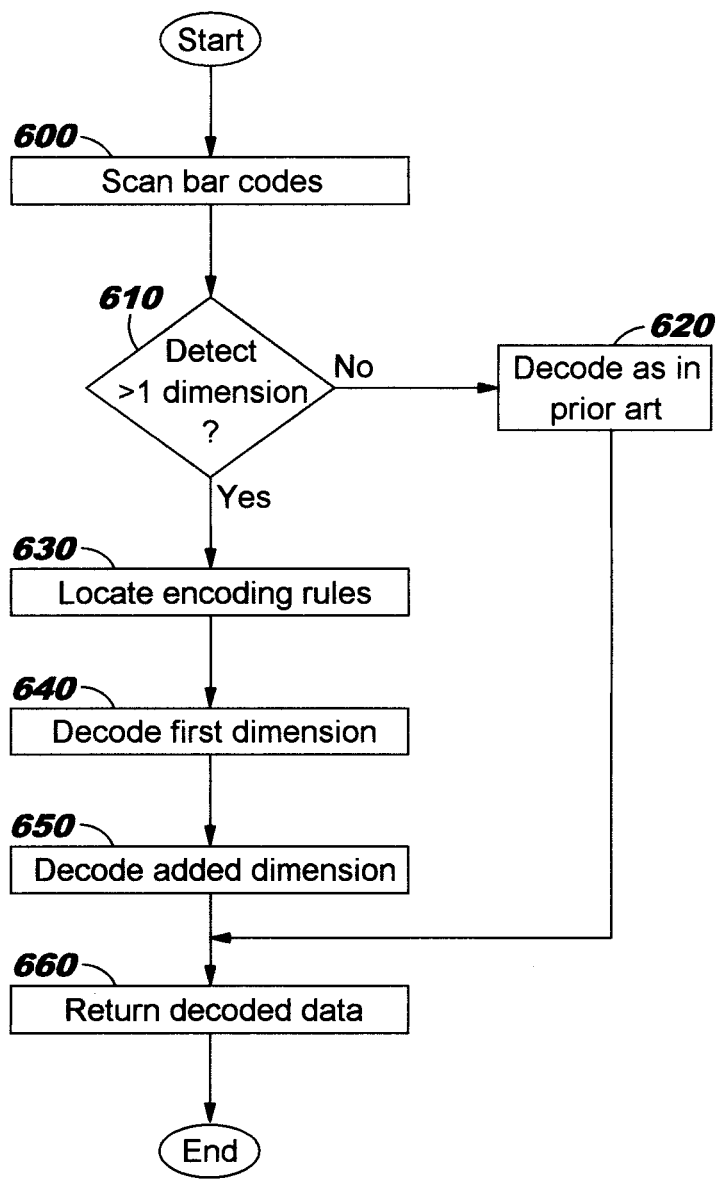
FIG. 6 provides a flowchart depicting logic which may be used when decoding a 2-dimensional bar code, according to an embodiment of the present invention.

Referring now to FIG. 6, a flowchart is provided that depicts logic which may be used when decoding a 2-dimensional bar code, according to an embodiment of the present invention. It is noted that the physical hardware characteristics of a conventional scanner do not necessarily require changing in order to decode a 2-D bar code disclosed herein. Instead, a scanner is configured to use software and/or firmware that carries out the decoding of the 2-D bar code disclosed herein. (See also the discussion of FIG. 7, below, for more information about a scanner device that may be used with an embodiment of the present invention.) Thus, the scanner scans a presented bar code at Block 600. Preferably, the entirety of the bar code is scanned at one time. Start/stop characters may be used to determine the physical bounds of the bar code, in a similar manner to known techniques.

Block 610 tests whether the scanner detects more than 1 dimension of data in the scanned bar code. This determination differs according to which of the above-described embodiments is implemented. A particular scanner may be configured to detect (and decode) only a particular one of these embodiments—that is, only a particular 2-D encoding. Alternatively, a scanner may be configured to detect (and decode) more than one of the above-disclosed encodings. With reference to the embodiment illustrated by FIG. 3, for example, the test at Block 610 comprises determining whether the scanned bar code contains dark bars in 2 or 3 different heights, with bars of the shortest height (see 311) being the rightmost bars (indicating the end of the additional encoded data). With reference to the embodiment illustrated by FIG. 4, the test at Block 610 comprises determining the presence of a horizontal bar (see 421) within the overall "quiet space" perimeter (indicating the end of the additional encoded data). As another alternative, the test at Block 610 may comprise determining whether the scanned bar code contains dark bars in N different heights, thus representing the above-discussed base N encoding, with an appropriate indicator 311 or 421 for the end of the additional data.

When the test at Block 610 has a negative result, meaning that bars of only a single height are present in the scanned bar code, then this is not a 2-D bar code as disclosed herein. Accordingly, the bar code is decoded using known techniques, as indicated in Block 620. Control then transfers to Block 660, where the decoded data is returned to the invoking logic, after which the processing of FIG. 6 then ends.

When the test at Block 610 has a positive result, on the other hand, control continues at Block 630, which locates the corresponding encoding rules for the detected 2-D encoding. With reference to the embodiment illustrated by FIG. 3, for example, this comprises determining that dark bars of the shortest height provide conventional 1-D bar code data, whereas dark bars of the intermediate and longest height provide the additional encoded data, and that the end of the additional encoded data is designated by the first-appearing short bar when proceeding from left to right. With reference to the embodiment illustrated by the mapping in FIG. 5, Block 630 comprises obtaining the mapping rules 500, as well as determining how many of the consecutive dark bars are to be interpreted in combination.

Block 640 indicates that the conventional bar code data of the 1-D encoding is decoded. The "3of9" encoding rules may be used to decode the sample character string "1234ABC" in the 1-D portion 310 of bar code 300 of FIG. 3, for example. Preferably, known techniques are used to determine which encoding is used within the 1-D portion (for example, "Code 3 of 9" or "CODE128").

Block 650 then decodes the additional encoded data from the 2-D encoding using the rules obtained at Block 630. With reference to the example additional encoded data 320 of FIG. 3, this comprises determining that the dark bars of the intermediate height represent binary zeroes whereas the dark bars of the longest height represent binary ones, and then forming 8-bit bytes from these binary values to determine the corresponding ASCII character.

Control reaches Block 660 of FIG. 6 following the decoding at either of Blocks 620 and 650. In the case of reaching Block 660 from Block 620, the decoded data represents a conventional 1-D bar code. In the case of reaching Block 660 from Block 650, the decoded data represents a conventional 1-D bar code as well as the additional encoded data decoded from the 2-D encoding. Block 660 therefore returns the decoded data to the invoking logic, after which the processing of FIG. 6 then ends for the bar code that was scanned at Block 600. (The manner in which the returned decoded data is used by an application may vary without departing from the scope of the present invention.)

As can be seen by the above disclosure, an embodiment of the present invention allows for adding more data to a conventional 1-D bar code, without increasing the width of the 1-D bar code, and without having to print multiple bar codes for a single item, and without having to print a bar code in more than one color.

Furthermore, the disclosed approach is backward compatible, as it allows standard laser scanners to be used for reading the 1-D data. Thus, existing scanners which may be in place at distribution centers, retail outlets, and so forth will continue to operate and will continue to read the conventional 1-D data (and the additional data encoded according to an embodiment of the present invention will effectively be hidden from those scanners, and thus to the operators of those scanners). At the same time, manufacturers, wholesalers, and other entities may implement new 2-D scanners that are capable of reading the additional data encoded according to techniques disclosed herein. It may therefore be desirable to use the additional encoded data to contain information that is only useful to such entities. Examples of data that may be encoded as additional data for use by such entities include lot numbers, manufacturing dates, authentication or security codes, and so forth.

Optionally, the additional encoding may be used for providing some level of data privacy and/or for hiding data, due to the fact that a scanner configured to read and decode the additional encoded data, as disclosed herein, is needed. Use of proprietary encoding rules (of the form discussed above with reference to FIG. 5, for example) may be used for encoding the additional data to increase the likelihood that only an intended recipient of the additional encoded data will receive it.

Figure 7:
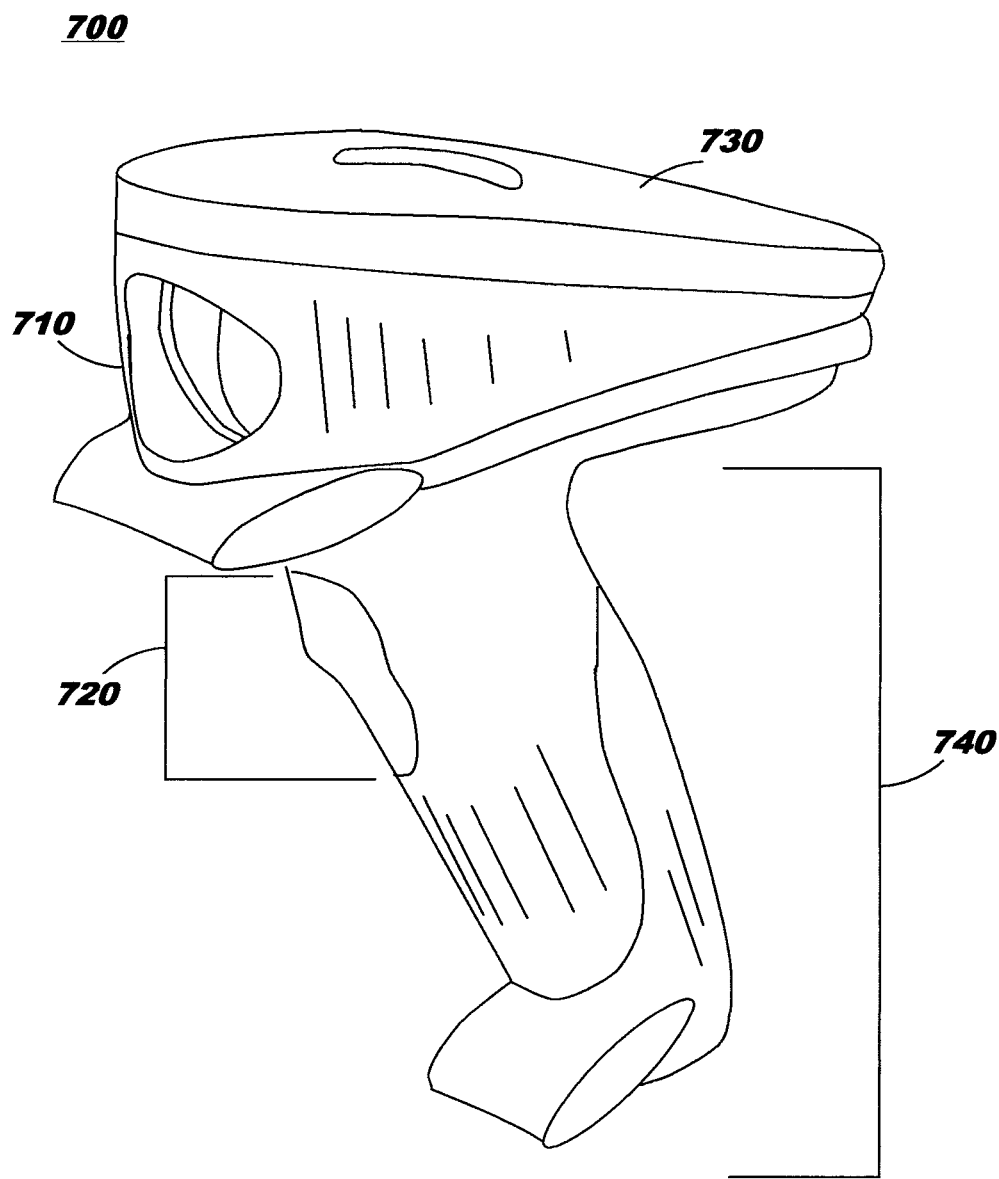
FIG. 7 illustrates a representative scanner device which may be used with one or more embodiments of the present invention.

Referring now to FIG. 7, a representative scanner device 700 that may be used with one or more embodiments of the present invention is shown. The scanner 700 includes a scanning portion 710, which may use laser technology for reading a bar code of items. A handle portion 740 of the scanner may include a trigger portion 720 that causes the scanning of a bar code to be performed. (A scanner may also include various buttons, which have not been illustrated in FIG. 7.)

It should be understood that the scanner device 700 of FIG. 7 is provided by way of illustration and not of limitation: other types of scanning devices may be used without deviating from the scope of the present invention. As one example, whereas scanner device 700 is shown as a handheld device that is portable/mobile, an embodiment of the present invention may be used with fixed scanners which are affixed to a platform or otherwise caused to be stationary. As another example, the scanning operation may be performed by other types of device, such as a camera which is configured to evaluate the scanned information (or to send a scanned image to another device for such evaluation) according to an embodiment of the present invention, without deviating from the scope of the present invention.

Figure 8:
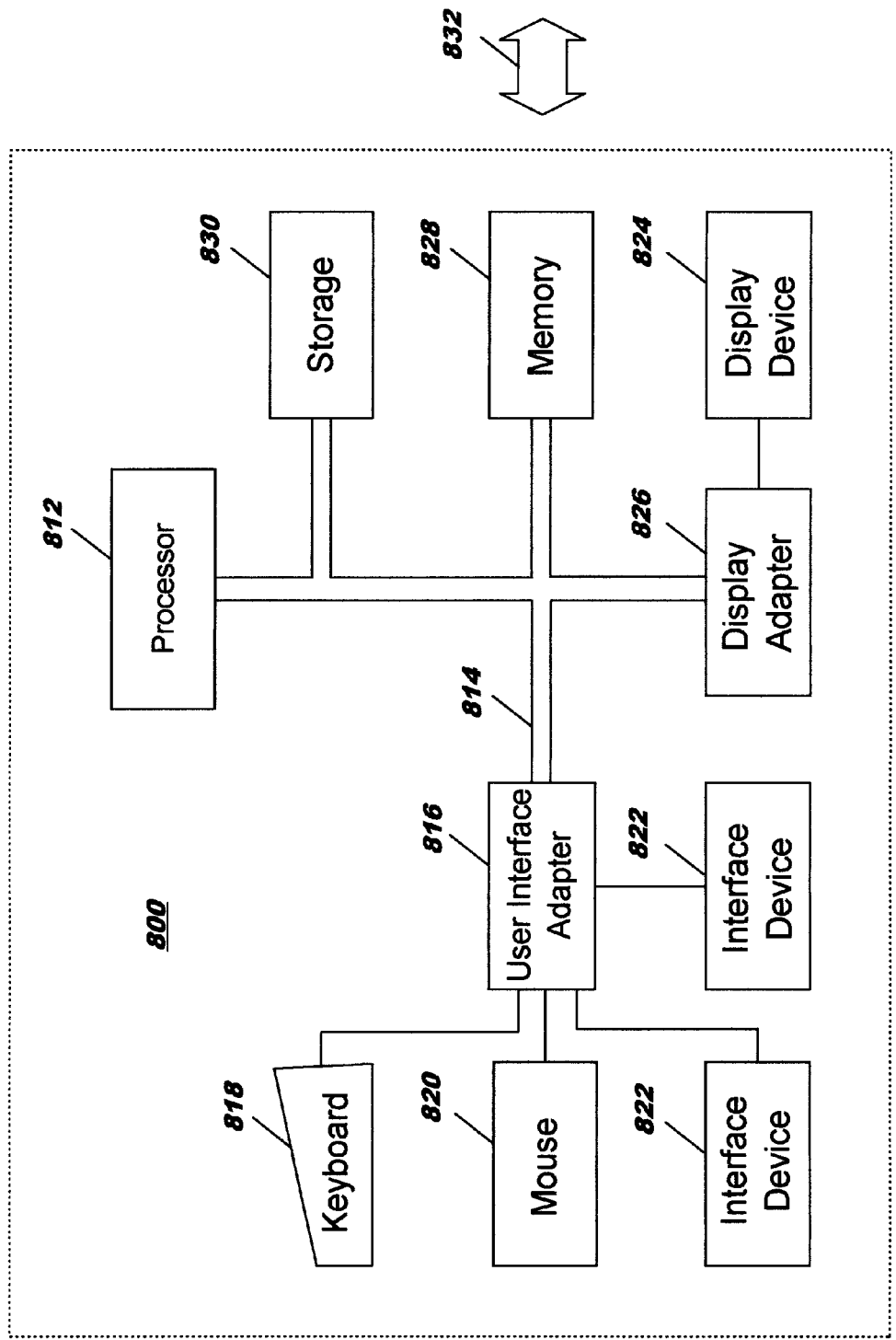
FIG. 8 depicts a data processing system suitable for storing and/or executing program code.

Referring now to FIG. 8, a data processing system 800 suitable for storing and/or executing program code includes at least one processor 812 coupled directly or indirectly to memory elements through a system bus 814. The memory elements can include local memory 828 employed during actual execution of the program code, bulk storage 830, and cache memories (not shown) which provide temporary storage of at least some program code in order to reduce the number of times code must be retrieved from bulk storage during execution.

Input/output (I/O") devices (including but not limited to keyboards 818, displays 824, pointing devices 820, other interface devices 822, etc.) can be coupled to the system either directly or through intervening I/O controllers or adapters (816, 826).

Network adapters may also be coupled to the system to enable the data processing system to become coupled to other data processing systems or remote printers or storage devices through intervening private or public networks (as shown generally at 832). Modems, cable modem attachments, wireless adapters, and Ethernet cards are just a few of the currently-available types of network adapters.

Figure 9:
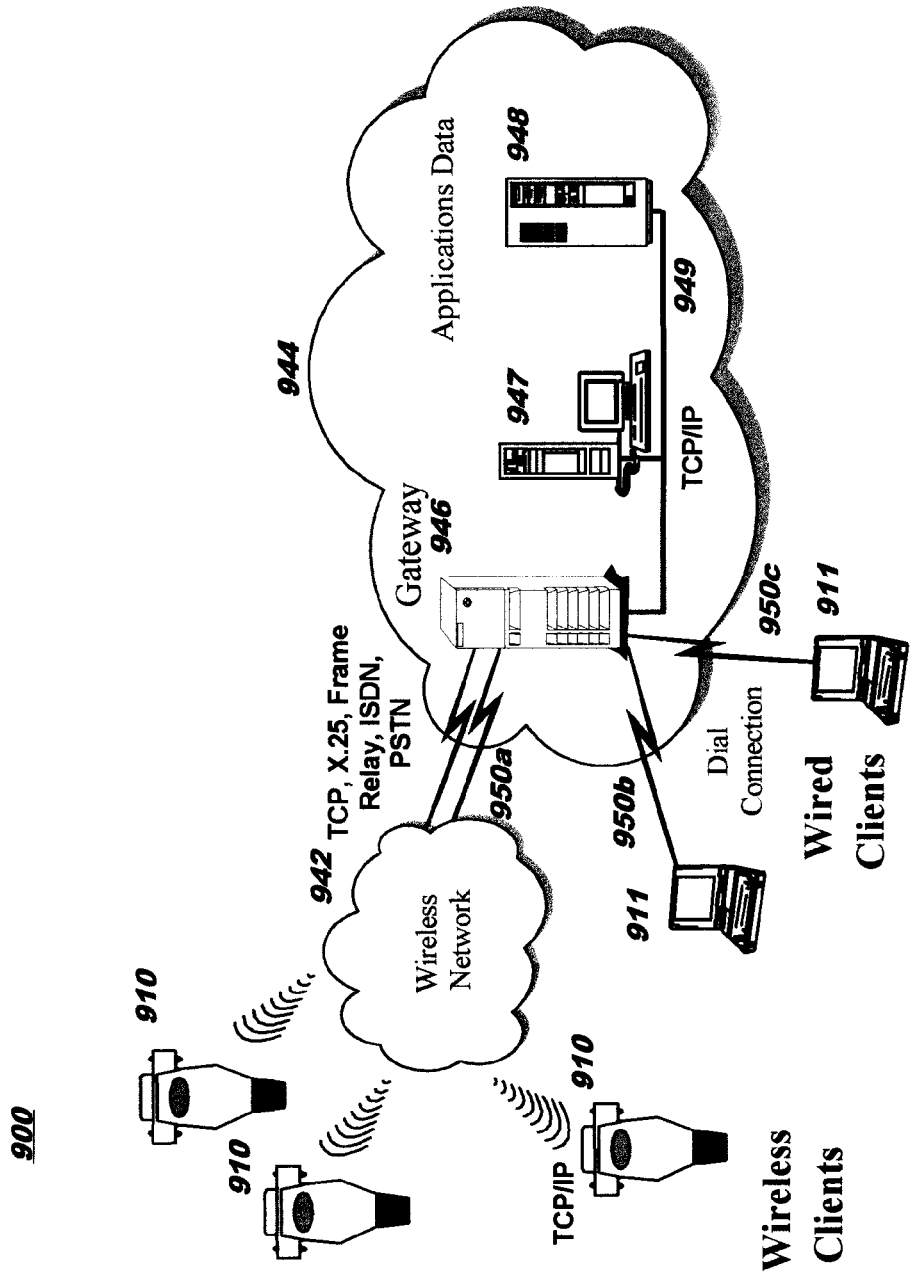
FIG. 9 depicts a representative networking environment in which one or more embodiments of the present invention may be used.

An embodiment of the present invention may be used in an environment that includes a data processing network. For example, decoded data may be sent from a scanner to a remotely-located server hosting an application which will use the decoded data. As another example, a scanned image might be sent from a scanner to a remotely-located device which processes the image to perform the decoding. Accordingly, FIG. 9 illustrates a data processing network environment 900 in which the present invention may be practiced. The data processing network 900 may include a plurality of individual networks, such as wireless network 942 and network 944. A plurality of scanner devices 910 (as well as other devices, not shown) may communicate over wireless network 942, and a plurality of devices, shown in the figure (by way of illustration) as workstations 911, may communicate over network 944. Additionally, as those skilled in the art will appreciate, one or more local area networks ("LANs") may be included (not shown), where a LAN may comprise a plurality of devices coupled to a host processor.

Still referring to FIG. 9, the networks 942 and 944 may also include mainframe computers or servers, such as a gateway computer 946 or application server 947 (which may access a data repository 948). A gateway computer 946 serves as a point of entry into each network 944. The gateway 946 may be preferably coupled to another network 942 by means of a communications link 950a. The gateway 946 may also be directly coupled to one or more workstations 911 using a communications link 950b, 950c, and/or may be indirectly coupled to such devices. The gateway computer 946 may be implemented utilizing an Enterprise Systems Architecture/ 370™ available from the International Business Machines Corporation ("IBM®"), an Enterprise Systems Architecture/390® computer, etc. Depending on the application, a midrange computer, such as an Application System/400® (also known as an AS/400®) may be employed. ("Enterprise Systems Architecture/370" is a trademark of IBM; "IBM", "Enterprise Systems Architecture/390", "Application System/400", and "AS/400" are registered trademarks of IBM.)

The gateway computer 946 may also be coupled 949 to a storage device (such as data repository 948).

Those skilled in the art will appreciate that the gateway computer 946 may be located a great geographic distance from the network 942, and similarly, the scanner devices 910 and/or workstations 911 may be located some distance from the networks 942 and 944, respectively. For example, the network 942 may be located in California, while the gateway 946 may be located in Texas, and one or more of the workstations 911 may be located in Florida. The scanner devices 910 may connect to the wireless network 942 using a networking protocol such as the Transmission Control Protocol/Internet Protocol ("TCP/IP") over a number of alternative connection media, such as cellular phone, radio frequency networks, satellite networks, etc. The wireless network 942 preferably connects to the gateway 946 using a network connection 950a such as TCP or User Datagram Protocol ("UDP") over IP, X.25, Frame Relay, Integrated Services Digital Network ("ISDN"), Public Switched Telephone Network ("PSTN"), etc. The workstations 910 may connect directly to the gateway 946 using dial connections 950b or 950c. Further, the wireless network 942 and network 944 may connect to one or more other networks (not shown), in an analogous manner to that depicted in FIG. 9.

As will be appreciated by one of skill in the art, embodiments of aspects of the present invention may be provided as (for example) methods, systems, and/or computer program products. A scanner that reads the additional encoded data, and a writer that creates the 2-D bar codes, are envisaged as hardware devices. Decoding of the data read by the scanner is envisaged as being embodied in software, which includes (but is not limited to) firmware, resident software, microcode, etc. Alternatively, the decoding may be implemented in hardware without deviating from the scope of the present invention. Furthermore, the decoding aspect of the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

Any combination of one or more computer-readable media may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage media would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer-readable storage medium may be any tangible medium that can contain or store a program for use by or in connection with an instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java®, Smalltalk, C++, or the like, and conventional procedural programming languages such as the "C" programming language or similar programming languages. ("Java" is a registered trademark of Oracle Corporation in the United States, other countries, or both.) The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention may be implemented using computer program instructions provided to a processor of a general purpose computer, special purpose computer, or other programmable data processing apparatus to produce a machine, such that the instructions, which execute via the processor of the computer or other programmable data processing apparatus, create means for implementing the functions/acts described herein.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the functions/acts described herein.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts described herein.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method of encoding data in bar codes, comprising:
encoding data in a plurality of dimensions within a bar code, the encoded data encoded so as to allow each of the plurality of dimensions to be decoded by a 2-dimensional bar code scan while providing backward compatibility whereby a 1-dimensional ("1-D") bar code scan can decode a first of the dimensions, wherein:
the encoded data encodes the first of the dimensions using varying widths of dark bars and varying widths of spaces therebetween while encoding a second of the dimensions by varying a height of the dark bars that encode the first of the dimensions;
the encoding of the second of the dimensions uses 3 different heights for the dark bars;
the second of the dimensions encodes additional data beyond the first of the dimensions; and
an end of the additional encoded data is signified by presence of a first-appearing dark bar, in a direction of scanning the dark bars and the spaces therebetween, having a shortest of the 3 different heights.

2. The method according to claim 1, wherein the encoding of the second of the dimensions employs a quiet space perimeter, the quiet space perimeter comprising an area adjacent to a top of the bar code, an area adjacent to a bottom of the bar code, an area adjacent to a left side of the bar code, and an area adjacent to a right side of the bar code.

3. A method of encoding data in bar codes, comprising:
encoding data in a plurality of dimensions within a bar code, the encoded data encoded so as to allow each of the plurality of dimensions to be decoded by a 2-dimensional bar code scan while providing backward compatibility whereby a 1-dimensional ("1-D") bar code scan can decode a first of the dimensions, wherein:
the encoded data encodes the first of the dimensions using varying widths of dark bars and varying widths of spaces therebetween while encoding a second of the dimensions by varying a height of the dark bars that encode the first of the dimensions;
the encoding of the second of the dimensions uses 2 different heights for the dark bars;
the second of the dimensions encodes additional data beyond the first of the dimensions; and
an end of the additional encoded data is signified by presence of a horizontal dark bar, in a direction of scanning the dark bars and the spaces therebetween.

4. The method according to claim 3, wherein:
the encoding of the second of the dimensions uses combinations of consecutive ones of the dark bars;
the varying height of the dark bars in each combination is compared to a mapping that defines which character is represented by the combination.

5. The method according to claim 3, further comprising:
decoding the encoded data in the plurality of dimensions, by the 2-dimensional bar code scan; and
providing the decoded data for use by an application.

6. The method according to claim 5, wherein the decoding of the encoded data in the plurality of dimensions occurs responsive to scanning a presented bar code, by the 2-dimensional bar code scan, and determining that the presented bar code represents data encoded in more than the first of the dimensions.

7. A system for encoding data in bar codes, comprising:
a computer comprising a processor; and
instructions which are executable, using the processor, to implement functions comprising:
encoding data in a plurality of dimensions within a bar code, the encoded data encoded so as to allow each of the plurality of dimensions to be decoded by a 2-dimensional bar code scan while providing backward compatibility whereby a 1-dimensional ("1-D") bar code scan can decode a first of the dimensions, wherein the encoded data encodes the first of the dimensions using varying widths of dark bars and varying widths of spaces therebetween while encoding a second of the dimensions by varying a height of the dark bars that encode the first of the dimensions, wherein:
the encoding of the second of the dimensions uses 3 different heights for the dark bars;
the second of the dimensions encodes additional data beyond the first of the dimensions; and
an end of the additional encoded data is signified by presence of a first-appearing dark bar, in a direction of scanning the dark bars and the spaces therebetween, having a shortest of the 3 different heights.

8. The system according to claim 7, wherein the functions further comprise:
decoding the encoded data in the plurality of dimensions, by the 2-dimensional bar code scan; and
providing the decoded data for use by an application.

9. The system according to claim 8, wherein the decoding of the encoded data in the plurality of dimensions occurs responsive to scanning a presented bar code, by the 2-dimensional bar code scan, and determining that the presented bar code represents data encoded in more than the first of the dimensions.

10. A system for encoding data in bar codes, comprising:
a computer comprising a processor; and
instructions which are executable, using the processor, to implement functions comprising:
encoding data in a plurality of dimensions within a bar code, the encoded data encoded so as to allow each of the plurality of dimensions to be decoded by a 2-dimensional bar code scan while providing backward compatibility whereby a 1-dimensional ("1-D") bar code scan can decode a first of the dimensions, wherein the encoded data encodes the first of the dimensions using varying widths of dark bars and varying widths of spaces therebetween while encoding a second of the dimensions by varying a height of the dark bars that encode the first of the dimensions, wherein:
the encoding of the second of the dimensions uses 2 different heights for the dark bars;
the second of the dimensions encodes additional data beyond the first of the dimensions; and
an end of the additional encoded data is signified by presence of a horizontal dark bar, in a direction of scanning the dark bars and the spaces therebetween.

11. A computer program product for encoding data in bar codes, the computer program product comprising:
a computer-readable storage medium having computer-readable program code embodied therein, the computer-readable program code configured for:

encoding data in a plurality of dimensions within a bar code, the encoded data encoded so as to allow each of the plurality of dimensions to be decoded by a 2-dimensional bar code scan while providing backward compatibility whereby a 1-dimensional ("1-D") bar code scan can decode a first of the dimensions, wherein the encoded data encodes the first of the dimensions using varying widths of dark bars and varying widths of spaces therebetween while encoding a second of the dimensions by varying a height of the dark bars that encode the first of the dimensions, wherein:

the encoding of the second of the dimensions uses 3 different heights for the dark bars;

the second of the dimensions encodes additional data beyond the first of the dimensions; and an end of the additional encoded data is signified by presence of a first-appearing dark bar, in a direction of scanning the dark bars and the spaces therebetween, having a shortest of the 3 different heights.

12. A computer program product for encoding data in bar codes, the computer program product comprising:

a computer-readable storage medium having computer-readable program code embodied therein, the computer-readable program code configured for:

encoding data in a plurality of dimensions within a bar code, the encoded data encoded so as to allow each of the plurality of dimensions to be decoded by a 2-dimensional bar code scan while providing backward compatibility whereby a 1-dimensional ("1-D") bar code scan can decode a first of the dimensions, wherein the encoded data encodes the first of the dimensions using varying widths of dark bars and varying widths of spaces therebetween while encoding a second of the dimensions by varying a height of the dark bars that encode the first of the dimensions, wherein:

the encoding of the second of the dimensions uses 2 different heights for the dark bars;

the second of the dimensions encodes additional data beyond the first of the dimensions; and an end of the additional encoded data is signified by presence of a horizontal dark bar, in a direction of scanning the dark bars and the spaces therebetween.

13. The computer program product according to claim 12, wherein the computer-readable program code is further configured for:

decoding the encoded data in the plurality of dimensions, by the 2-dimensional bar code scan; and providing the decoded data for use by an application.

14. The computer program product according to claim 13, wherein the decoding of the encoded data in the plurality of dimensions occurs responsive to scanning a presented bar code, by the 2-dimensional bar code scan, and determining that the presented bar code represents data encoded in more than the first of the dimensions.

\* \* \* \* \*